United States Patent
Itoh et al.

(10) Patent No.: US 12,173,197 B2
(45) Date of Patent: Dec. 24, 2024

(54) ORGANOPOLYSILOXANE COMPOSITION FOR FORMING PRESSURE SENSITIVE ADHESIVE LAYER, AND USE OF SAME

(71) Applicant: DOW TORAY CO., LTD., Tokyo (JP)

(72) Inventors: Maki Itoh, Ichihara (JP); Akihiro Nakamura, Ichihara (JP); Michitaka Suto, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 457 days.

(21) Appl. No.: 17/267,367

(22) PCT Filed: Aug. 13, 2019

(86) PCT No.: PCT/JP2019/031809
§ 371 (c)(1),
(2) Date: May 19, 2021

(87) PCT Pub. No.: WO2020/032286
PCT Pub. Date: Feb. 13, 2020

(65) Prior Publication Data
US 2021/0269691 A1    Sep. 2, 2021

(30) Foreign Application Priority Data

Aug. 10, 2018   (JP) ................................ 2018-151132

(51) Int. Cl.
| | |
|---|---|
| *C09J 183/06* | (2006.01) |
| *B01J 23/42* | (2006.01) |
| *C09J 7/38* | (2018.01) |
| *H04R 31/00* | (2006.01) |

(52) U.S. Cl.
CPC ............. *C09J 183/06* (2013.01); *B01J 23/42* (2013.01); *C09J 7/38* (2018.01); *C09J 2301/122* (2020.08); *C09J 2301/16* (2020.08); *C09J 2483/00* (2013.01); *C09J 2483/005* (2013.01); *H04R 31/00* (2013.01)

(58) Field of Classification Search
None
See application file for complete search history.

(56) References Cited

U.S. PATENT DOCUMENTS

| | | |
|---|---|---|
| 3,983,298 A | 9/1976 | Hahn et al. |
| 4,051,454 A | 9/1977 | Leiser et al. |
| 4,082,726 A | 4/1978 | Mine et al. |
| 5,248,739 A | 9/1993 | Schmidt et al. |
| 5,290,885 A | 3/1994 | Vincent et al. |
| 5,366,809 A | 11/1994 | Schmidt et al. |
| 6,121,368 A | 9/2000 | Heying et al. |
| 8,044,153 B2 | 10/2011 | Yamamoto et al. |
| 10,125,242 B2 | 11/2018 | Iimura et al. |
| 10,618,255 B2 | 4/2020 | Choi et al. |
| 2004/0097639 A1 | 5/2004 | Gordon et al. |
| 2006/0172140 A1 | 8/2006 | Kuroda et al. |
| 2007/0047754 A1* | 3/2007 | Kishi .................. H04R 9/045 381/409 |
| 2007/0059535 A1 | 3/2007 | Nakamura |
| 2009/0118441 A1* | 5/2009 | Yamamoto .......... C08L 83/04 525/478 |
| 2010/0323145 A1 | 12/2010 | Aoki |
| 2011/0097579 A1 | 4/2011 | Mizuno et al. |
| 2012/0040180 A1 | 2/2012 | Husemann et al. |
| 2012/0113361 A1 | 5/2012 | Huang et al. |
| 2012/0231245 A1 | 9/2012 | Kim et al. |
| 2013/0069890 A1 | 3/2013 | Lee et al. |
| 2013/0186564 A1 | 7/2013 | Keller et al. |
| 2015/0337188 A1 | 11/2015 | Sakakibara et al. |
| 2017/0190878 A1 | 7/2017 | Iimura et al. |
| 2017/0217143 A1 | 8/2017 | Kim et al. |

(Continued)

FOREIGN PATENT DOCUMENTS

| | | |
|---|---|---|
| CN | 1714117 A | 12/2005 |
| CN | 104387778 A | 3/2015 |

(Continued)

OTHER PUBLICATIONS

Machine assisted English translation of CN107250313A obtained from https://patents.google.com/patent on Feb. 16, 2022, 9 pages.
Machine assisted English Translation of JPH08209104A obtained from https://worldwide.espacenet.com on Apr. 28, 2021, 8 pages.
Machine assisted English Translation of JP2006225420A obtained from https://worldwide.espacenet.com on Apr. 28, 2021, 17 pages.
Machine assisted English Translation of JP2013233852A obtained from https://worldwide.espacenet.com on Apr. 28, 2021, 22 pages.
Machine assisted English Translation of JP2014063064A obtained from https://worldwide.espacenet.com on Apr. 28, 2021, 21 pages.

(Continued)

*Primary Examiner* — Alicia Chevalier
*Assistant Examiner* — Thomas A Mangohig
(74) *Attorney, Agent, or Firm* — WARNER NORCROSS + JUDD LLP

(57) ABSTRACT

A curable organopolysiloxane composition is provided which forms a pressure sensitive adhesive (PSA) layer having a relatively low storage elastic modulus (G') at low temperatures, excellent curability, and sufficient adhesion for practical use. A PSA layer-forming organopolysiloxane composition comprises: (A) a chain organopolysiloxane having alkenyl groups; (B) an organopolysiloxane resin which has a content of 9 moles or less of hydroxyl groups and the like is a mixture of (b1) an organopolysiloxane resin having a weight average molecular weight (Mw) of 4500 or more and (b2) an organopolysiloxane resin having a Mw of less than 4500; (C) an organohydrogenpolysiloxane; and (D) a hydrosilylation reaction catalyst. The mass ratio of component (B) to component (A) is within a range of 0.9 to 2.0, and the shear storage elastic modulus G' at −20° C. of a PSA layer obtained by curing the composition is within a range of 0.01 to 0.75 MPa.

13 Claims, No Drawings

(56) References Cited

U.S. PATENT DOCUMENTS

| | | | |
|---|---|---|---|
| 2018/0065347 | A1 | 3/2018 | Fukui et al. |
| 2018/0208799 | A1 | 7/2018 | Liu et al. |
| 2018/0258332 | A1 | 9/2018 | Song et al. |
| 2018/0362810 | A1 | 12/2018 | Bogner et al. |
| 2019/0134946 | A1 | 5/2019 | Choi et al. |
| 2020/0224069 | A1 | 7/2020 | Itoh et al. |
| 2020/0354615 | A1 | 11/2020 | Itoh et al. |
| 2020/0392383 | A1 | 12/2020 | Hino et al. |
| 2021/0269691 | A1 | 9/2021 | Itoh et al. |
| 2021/0284888 | A1 | 9/2021 | Itoh et al. |
| 2021/0292607 | A1 | 9/2021 | Itoh et al. |

FOREIGN PATENT DOCUMENTS

| | | | | |
|---|---|---|---|---|
| CN | 106118584 | A | 11/2016 | |
| CN | 107250313 | A | 10/2017 | |
| EP | 0537784 | A1 | 4/1993 | |
| EP | 0581539 | A2 | 2/1994 | |
| EP | 2322584 | A1 | 5/2011 | |
| EP | 2570899 | A2 | 3/2013 | |
| EP | 2627714 | A1 | 8/2013 | |
| EP | 2788448 | A1 | 10/2014 | |
| EP | 2865719 | A1 | 4/2015 | |
| JP | S62181357 | A | 8/1987 | |
| JP | H05214316 | A | 8/1993 | |
| JP | H06228526 | A | 8/1994 | |
| JP | H07197008 | A | 8/1995 | |
| JP | H08209104 | A | 8/1996 | |
| JP | 2000044921 | A | 2/2000 | |
| JP | 2001081436 | A | 3/2001 | |
| JP | 2002322363 | A | 11/2002 | |
| JP | 2006213810 | A | 8/2006 | |
| JP | 2006225420 | A | 8/2006 | |
| JP | 2007009189 | A | 1/2007 | |
| JP | 2007131694 | A | 5/2007 | |
| JP | 2009051916 | A | 3/2009 | |
| JP | 2010108038 | A | 5/2010 | |
| JP | 2010248413 | A | 11/2010 | |
| JP | 2013065009 | A | 4/2013 | |
| JP | 2013512326 | A | 4/2013 | |
| JP | 2013233852 | A | 11/2013 | |
| JP | 2014063064 | A | 4/2014 | |
| JP | 5553395 | B2 | 7/2014 | |
| JP | 2014182335 | A | 9/2014 | |
| JP | 2014522436 | A | 9/2014 | |
| JP | 5753103 | B2 | 7/2015 | |
| JP | 2017047767 | A | 3/2017 | |
| JP | 6417310 | B2 | 11/2018 | |
| JP | 2019031610 | A | 2/2019 | |
| KR | 20160083583 | A | 7/2016 | |
| KR | 20180012966 | A | 2/2018 | |
| TW | 201704348 | A | 2/2017 | |
| WO | 2004046225 | A1 | 6/2004 | |
| WO | 2012166870 | A1 | 12/2012 | |
| WO | 2015151221 | A1 | 10/2015 | |
| WO | 2016139955 | A1 | 9/2016 | |
| WO | 2017038913 | A1 | 3/2017 | |
| WO | 2017038920 | A1 | 3/2017 | |
| WO | WO-2017048890 | A1 * | 3/2017 | ............. C08G 77/20 |
| WO | 2017082654 | A1 | 5/2017 | |
| WO | 2017188308 | A1 | 11/2017 | |
| WO | 2018048240 | A1 | 3/2018 | |
| WO | 2018048245 | A1 | 3/2018 | |
| WO | 2018149717 | A1 | 8/2018 | |
| WO | 2018186161 | A1 | 10/2018 | |
| WO | 2018193973 | A1 | 10/2018 | |
| WO | 2019009175 | A1 | 1/2019 | |
| WO | 2020032285 | A1 | 2/2020 | |
| WO | 2020032286 | A1 | 2/2020 | |
| WO | 2020032287 | A1 | 2/2020 | |
| WO | 2021081863 | A1 | 5/2021 | |

OTHER PUBLICATIONS

Machine assisted English Translation of JP2014182335A obtained from https://worldwide.espacenet.com on Apr. 28, 2021, 30 pages.
Machine assisted English Translation of JP2017047767A obtained from https://worldwide.espacenet.com on Apr. 29, 2021, 23 pages.
Machine assisted English Translation of WO2020032285A1 obtained from https://worldwide.espacenet.com on Apr. 29, 2021, 43 pages.
Machine assisted English Translation of WO2020032286A1 obtained from https://worldwide.espacenet.com on Apr. 29, 2021, 37 pages.
Machine assisted English Translation of WO2020032287A1 obtained from https://worldwide.espacenet.com on Apr. 29, 2021, 36 pages.
English Translation of International Search Report for PCT/JP2019/031809, dated Oct. 15, 2019, 2 pages.
Machine assisted English translation of CN104387778A obtained from https://patents.google.com/patent on Nov. 3, 2022, 8 pages.
Machine assisted English translation of CN106118584A obtained from https://patents.google.com/patent on Nov. 3, 2022, 12 pages.
Machine assisted English translation of JP2000044921A obtained from https://patents.google.com/patent on Nov. 3, 2022, 8 pages.
Machine assisted English translation of JP2007009189A obtained from https://patents.google.com/patent on Nov. 3, 2022, 8 pages.
Machine assisted English translation of JP2010108038A obtained from https://patents.google.com/patent on Nov. 3, 2022, 10 pages.
Machine assisted English translation of JP2010248413A obtained from https://patents.google.com/patent on Nov. 3, 2022, 8 pages.
Machine assisted English translation of JP2014063064A obtained from https://patents.google.com/patent on Nov. 3, 2022, 9 pages.
Machine assisted English translation of JPS62181357A obtained from https://worldwide.espacenet.com/patent on Nov. 3, 2022, 4 pages.
Machine assisted English translation of WO2018149717A1 obtained from https://worldwide.espacenet.com/patent on Aug. 29, 2023, 15 pages.
English translation of International Search Report for PCT/JP2018/010769 dated Jun. 12, 2018, 2 pages.
Machine assisted English translation of JP2002322363 obtained from https://worldwide.espacenet.com/patent on Oct. 17, 2023, 21 pages.
International Search Report (with translation) for PCT/JP2020/030624 dated Oct. 27, 2020, 4 pages.
International Search Report (with translation) for PCT/JP2020/030625 dated Oct. 27, 2020, 4 pages.
International Search Report (with translation) for PCT/JP2020/030623 dated Oct. 27, 2020, 4 pages.
Machine assisted English translation of KR20160083583 obtained from https://worldwide.espacenet.com/patent on Oct. 17, 2023, 26 pages.
Machine assisted English translation of JP2019031610 obtained from https://worldwide.espacenet.com/patent on Oct. 17, 2023, 14 pages.
Machine assisted English translation of JP6417310 obtained from https://worldwide.espacenet.com/patent on Oct. 17, 2023, 10 pages.
Machine assisted English translation of JP5553395 obtained from https://worldwide.espacenet.com/patent on Oct. 17, 2023, 20 pages.
Machine assisted English translation of WO2018048245 obtained from https://worldwide.espacenet.com/patent on Oct. 17, 2023, 21 pages.
Machine assisted English translation of WO2018048240 obtained from https://worldwide.espacenet.com/patent on Oct. 17, 2023, 24 pages.
Machine assisted English translation of KR20180012966 obtained from https://worldwide.espacenet.com/patent on Oct. 17, 2023, 19 pages.
Machine assisted English translation of WO2017038920 obtained from https://worldwide.espacenet.com/patent on Oct. 17, 2023, 17 pages.
Machine assisted English translation of WO2017038913 obtained from https://worldwide.espacenet.com/patent on Oct. 17, 2023, 17 pages.

(56) References Cited

OTHER PUBLICATIONS

Machine assisted English translation of WO2015151221 obtained from https://worldwide.espacenet.com/patent on Oct. 17, 2023, 16 pages.

* cited by examiner

ORGANOPOLYSILOXANE COMPOSITION FOR FORMING PRESSURE SENSITIVE ADHESIVE LAYER, AND USE OF SAME

CROSS-REFERENCE TO RELATED APPLICATIONS

This application is the U.S. National Stage of International Application No. PCT/JP2019/031809 filed on 13 Aug. 2019, which claims priority to and all advantages of Japanese Application No. 2018-151132 filed on 10 Aug. 2018, the content of which is incorporated herein by reference.

TECHNICAL FIELD

The present invention relates to a curing reactive organopolysiloxane composition that forms a pressure sensitive adhesive layer. In particular, the present invention relates to a curable organopolysiloxane composition having sufficient curability and adhesion for practical use in addition to having a relatively low storage elastic modulus in a wide temperature range including low temperatures. Moreover, the present invention relates to a pressure sensitive adhesive composition that uses the composition, along with applications such as laminated bodies, electronic parts, or display devices (including flexible displays, touch panels, etc.) that use the composition.

BACKGROUND ART

Polysiloxane pressure sensitive adhesive compositions have excellent electrical insulating properties, heat resistance, cold resistance, and adhesion to various adherends in comparison to acrylic or rubber-based pressure sensitive adhesive compositions and are therefore used in heat-resistant adhesive tapes, electrically insulating adhesive tapes, heat seal tapes, plating masking tapes, and the like. These polysiloxane pressure sensitive adhesive compositions are classified into addition reaction curing types, condensation reaction curing types, peroxide curing types, and the like based on the curing mechanisms thereof. Addition reaction curing type pressure sensitive adhesive compositions are widely used because the compositions cure quickly when left to stand at room temperature or by heating and do not generate by-products.

Taking advantage of the above characteristics of polysiloxane pressure sensitive adhesives as well as characteristics which can achieve high transparency thereof as required, applications to the field of advanced electronic materials and display elements such as smart devices have been investigated in recent years. Such a device assumes a structure in which a film made of a plurality of layers, including an electrode layer and a display layer, is sandwiched between transparent substrates, with a polysiloxane pressure sensitive adhesive having excellent heat resistance and cold resistance expected to work effectively for the purpose of protecting the electrode layer and the display layer and improving adhesion between layers.

In particular, in recent material development, there is a need for a polysiloxane pressure sensitive adhesive composition which has a relatively low storage elastic modulus (for example, shear storage elastic modulus G') in a wide temperature region, including low temperatures such as −20° C., etc., has excellent curability, and has sufficient adhesion for practical use. Unfortunately, because the pressure sensitive adhesive composition described in the known literature, etc. does not sufficiently satisfy these characteristics, there remains room for improvement.

For example, while Patent Document 1 discloses an adhesive rubber sheet, there is no mention or suggestion of using a combination of resin components having less resin component content in the ratio of the resin component and siloxane polymer component in addition to having certain characteristics such as molecular weight and hydroxyl group content. Further, the adhesive rubber sheet uses finely powdered silica, etc. and does not satisfy the intended storage elastic modulus (G') of the present invention.

Similarly, while Patent Document 2 discloses a silicone pressure sensitive adhesive which uses an organopolysiloxane resin having a number average molecular weight of 950 to 1600, there is no mention or suggestion of using a combination of resin components with specific characteristics such as the content of hydroxyl groups. Further, while the silicone pressure sensitive adhesive has a certain adhesive force, it does not satisfy the intended storage elastic modulus (G') of the present invention.

In contrast, Patent Document 3 proposes a laminated body provided with a transparent resin adhesive layer, wherein the substance amount ratio of the resin component to the polymer component is within a range of 0.5 to 1.0 and the difference in the storage elastic modulus G' at low temperatures and room temperature is small. Unfortunately, only a condensation reactive transparent resin adhesive layer is specifically disclosed, making the curing reaction problematically too slow for industrial use. Further, the transparent resin adhesive layer does not satisfy the intended storage elastic modulus (G') and sufficient adhesion for practical use according to the present invention.

Here, the present applicants propose a curable silicone composition capable of forming a cured layer having a sufficient elastic modulus and loss coefficient (tan δ) in a flexible laminated body application in Patent Document 4. Unfortunately, while the composition specifically disclosed in the examples, etc. partially discloses a combination of resin components having different weight average molecular weights, it cannot sufficiently solve the problems of the present invention.

RELATED ART DOCUMENTS

Patent Documents

Patent Document 1: Japanese Unexamined Patent Application Publication No. 2006-225420
Patent Document 2: Japanese Unexamined Patent Application Publication No. H05-214316
Patent Document 3: International Patent Application (WO) 2017-082654
Patent Document 4: International Patent Application (WO) 2017-188308

SUMMARY OF THE INVENTION

Problem to be Solved by the Invention

The present invention has been created in order to solve the abovementioned problems, with an object of providing a curing reactive organopolysiloxane composition which forms a pressure sensitive adhesive layer having a relatively low storage elastic modulus (G') at low temperatures such as −20° C., excellent curability, and sufficient adhesion for practical use. Another object of the present invention is to provide the usage of the curing reactive organopolysiloxane composition or a cured product thereof as a pressure sensitive adhesive layer, the usage of the same as an elastic adhesive member in various applications, and equipment and a device provided with the same.

Means for Solving the Problem

As a result of conducting diligent research on the problems described above, the present inventors arrived at the present invention. That is, one object of the present invention is achieved by a hydrosilylation reaction-curable pressure sensitive adhesive layer-forming organopolysiloxane composition, wherein the sum of the content of hydroxyl groups and hydrolyzable groups with respect to all silicon atoms in the molecule is 9 mole % or less, two or more types of organopolysiloxane resins having different molecular weight ranges are used in combination, the mass ratio of the organopolysiloxane resin to the chain organopolysiloxane is adjusted to a range of 0.9 to 2.0, and the shear storage elastic modulus G' at −20° C. of a pressure sensitive adhesive layer obtained by curing the composition is within a range from 0.01 to 0.75 MPa. In addition, the problems described above can be solved through the use of the curing reactive organopolysiloxane composition or a cured product thereof as a pressure sensitive adhesive layer, the use of the same as an electronic material or a member for a display device, and an electronic part or a display device provided with the same.

That is, the present invention provides the following:

"[1] A pressure sensitive adhesive layer-forming organopolysiloxane composition, including: (A) a chain organopolysiloxane having alkenyl groups in numbers greater than 1 on average within the molecule;
(B) an organopolysiloxane resin mixture including the following components (b1) and (b2) at a mass ratio of 1:99 to 99:1:
(b1) an organopolysiloxane resin, wherein the total content of hydroxyl groups and hydrolyzable groups with respect to all silicon atoms in the molecule is 9 mole % or less, and the weight average molecular weight (Mw) measured in terms of standard polystyrene by gel permeation chromatography (GPC) is 4500 or more; and
(b2) an organopolysiloxane resin, wherein the total content of hydroxyl groups and hydrolyzable groups with respect to all silicon atoms in the molecule is 9 mole % or less, and the weight average molecular weight (Mw) measured in terms of standard polystyrene by gel permeation chromatography (GPC) is less than 4500;
(C) an organohydrogenpolysiloxane having at least two Si—H bonds in the molecule; and
(D) an effective amount of a hydrosilylation reaction catalyst, wherein the mass ratio of component (B) to component (A) is within a range of 0.9 to 2.0, and the shear storage elastic modulus G' at −20° C. of a pressure sensitive adhesive layer obtained by curing the composition is within a range of 0.01 to 0.75 MPa
[2] The pressure sensitive adhesive layer-forming organopolysiloxane composition according to [1], wherein the adhesive force of a pressure sensitive adhesive layer having a thickness of 50 μm obtained by curing the composition, as measured at a tensile speed of 300 mm/min using a 180° peeling test method according to JIS Z 0237 for a polymethyl methacrylate sheet having a thickness of 2 mm, is within a range of 360 to 1700 gf/inch.
[3] The pressure sensitive adhesive layer-forming organopolysiloxane composition according to [1] or [2],
wherein component (A) is a chain organopolysiloxane, at least a portion of component (A) is (A1) a raw rubber-like alkenyl group-containing organopolysiloxane having a viscosity of 100,000 mPa·s or more at 25° C. or having a plasticity within a range of 50 to 200 as measured in accordance with a method as prescribed in JIS K6249, and the content of a vinyl (CH2=CH) moiety of alkenyl groups is within a range of 0.005 to 0.400 mass %,
the organopolysiloxane resin mixture which is component (B) is an organopolysiloxane resin mixture which consists essentially of $R_3SiO_{1/2}$ units (M units, wherein R is a monovalent organic group and 90 mole % or more of R is an alkyl group having 1 to 6 carbon atoms or a phenyl group) and $SiO_{4/2}$ units (Q units),
the amount of component (C) is an amount such that the ratio (molar ratio) of the amount of SiH groups in component (C) to the total amount of the alkenyl groups in components (a) and (b) is 0.1 to 100, and
the amount of component (D) is an amount such that the content of a platinum based metal in a solid content of the composition is within a range of 0.1 to 200 ppm.
[4] The pressure sensitive adhesive layer-forming organopolysiloxane composition according to any one of [1] to [3], wherein the amount of component (C) is an amount such that the ratio (molar ratio) of the amount of SiH groups in component (C) to the total amount of the alkenyl groups in components (a) and (b) is 20 to 60.
[5] The pressure sensitive adhesive layer-forming organopolysiloxane composition according to any one of [1] to [4], further including (A') a chain organopolysiloxane which does not contain a carbon-carbon double bond-containing reactive group in the molecule.
[6] A pressure sensitive adhesive layer obtained by curing the pressure sensitive adhesive layer-forming organopolysiloxane composition according to any one of [1] to [5].
[7] A laminated body comprising a pressure sensitive adhesive layer obtained by curing the pressure sensitive adhesive layer-forming organopolysiloxane composition according to any one of [1] to [5] on a film-like substrate.
[8] The laminated body according to [7], wherein a release layer for the pressure sensitive adhesive layer is provided on one or two or more film-like substrates.
[9] The laminated body according to [7] or [8], including: a film-like substrate; a first release layer formed on the film-like substrate;
a pressure sensitive adhesive layer formed by applying and curing the pressure sensitive adhesive layer-forming organopolysiloxane composition according to any one of [1] to [5] on the release layer; and a second release layer laminated on the pressure sensitive adhesive layer.
[10] An elastic adhesive member obtained by curing the pressure sensitive adhesive layer-forming organopolysiloxane composition according to any one of [1] to [5].
[11] Electronic equipment or an electrical device comprising the elastic adhesive member according to [10]."

Effects of the Invention

The pressure sensitive adhesive layer-forming organopolysiloxane composition according to the present invention can form a pressure sensitive adhesive layer which has excellent curability due to a hydrosilylation reaction, sufficient adhesion for practical use when cured, a relatively low storage elastic modulus (G') at low temperatures such as −20° C., and sufficient adhesion for practical use. Further, the curing reactive organopolysiloxane composition or a cured product thereof can be suitably used as a pressure sensitive adhesive layer, electronic material, or a member of a display device, wherein the electrical or electronic part or display device provided with the same satisfies the above-mentioned required characteristics, and wherein problems with poor curing, as well as the viscoelasticity of the adhesive layer in a wide temperature region including low temperatures, are sufficient. Consequently, a pressure sensitive adhesive layer can be formed in which a problem of poor adhesion to a substrate of an electronic component, etc. in a temperature region including low temperatures to room temperature is unlikely to occur, thus advantageously facilitating industrialization, such that improvements in the performance of a laminated body such as the resulting display device can be expected.

DESCRIPTION OF THE PREFERRED EMBODIMENT

[Pressure Sensitive Adhesive Layer-Forming Organopolysiloxane Composition]

First, the pressure sensitive adhesive layer-forming organopolysiloxane composition according to the present invention will be described. The composition rapidly cures via a curing reaction including a hydrosilylation reaction so as to form a pressure sensitive adhesive layer having a relatively low storage elastic modulus (G') at low temperatures such as −20° C. and having sufficient adhesion for practical use. Hereinafter, each component thereof, the range of the organopolysiloxane resin mixture (which is a technical characteristic), the mass ratio of the organopolysiloxane resin to the chain organopolysiloxane, and the characteristics of the pressure sensitive adhesive layer will be described below.

As described above, the organopolysiloxane composition according to the present invention cures via a hydrosilylation reaction so as to form a pressure sensitive adhesive layer (having a certain adhesive force). In this composition, the sum of the content of hydroxyl groups and hydrolyzable groups with respect to all silicon atoms in the molecule is 9 mole % or less, a mixture of organopolysiloxane resins having different molecular weight ranges is used, and the range of formulation of the organopolysiloxane resin with respect to the chain organopolysiloxane (having alkenyl groups) serving as the main agent is within a specific range. The pressure sensitive adhesive layer obtained by curing the composition having this characteristic has a shear storage elastic modulus G' at −20° C. within a range of 0.01 to 0.75 MPa, in addition to suitably further having a certain adhesive force.

Specifically, the organopolysiloxane composition according to the present invention contains:
 (A) a chain organopolysiloxane having alkenyl groups in numbers greater than 1 on average within the molecule;
 (B) an organopolysiloxane resin mixture comprising the following components (b1) and (b2) at a mass ratio of 1:99 to 99:1:
 (b1) an organopolysiloxane resin, wherein the total content of hydroxyl groups and hydrolyzable groups with respect to all silicon atoms in the molecule is 9 mole % or less, and the weight average molecular weight (Mw) measured in terms of standard polystyrene by gel permeation chromatography (GPC) is 4500 or more; and
 (b2) an organopolysiloxane resin, wherein the total content of hydroxyl groups and hydrolyzable groups with respect to all silicon atoms in the molecule is 9 mole % or less, and the weight average molecular weight (Mw) measured in terms of standard polystyrene by gel permeation chromatography (GPC) is less than 4500;
 (C) an organohydrogenpolysiloxane having at least two Si—H bonds in the molecule; and
 (D) an effective amount of a hydrosilylation reaction catalyst.

In addition, since the composition contains a hydrosilylation reaction catalyst, the composition may further contain (E) a curing retarder from the perspective of handleability, and may further contain other additives to an extent that is not at odds with the object of the present invention. Hereinafter, each component will be described.

The alkenyl group-containing organopolysiloxane of component (A) is a chain polysiloxane molecule, is the main agent (base polymer) of this composition, and contains an alkenyl group bonded to a number of silicon atoms greater than 1 on average in each molecule, with the preferable number of alkenyl groups being no less than 1.5 groups in each molecule. Examples of the alkenyl groups of the organopolysiloxane of component (A) include alkenyl groups having a carbon number of from 2 to 10 such as vinyl groups, allyl groups, butenyl groups, pentenyl groups, hexenyl groups, and heptenyl groups, with vinyl groups or hexenyl groups being particularly preferable. Examples of the bonding position of the alkenyl groups of component (A) include the molecular chain terminals and/or the molecular side chains. Note that component (A) may contain a single component or may be a mixture of two or more different components.

Examples of silicon-bonded organic groups other than alkenyl groups in the organopolysiloxane of component (A) include: alkyl groups such as methyl groups, ethyl groups, propyl groups, butyl groups, pentyl groups, hexyl groups, and heptyl groups; aryl groups such as phenyl groups, tolyl groups, xylyl groups, and naphthyl groups; aralkyl groups such as benzyl groups and phenethyl groups; and halogenated alkyl groups such as chloromethyl groups, 3-chloropropyl groups, and 3,3,3-trifluoropropyl groups, with methyl groups and phenyl groups being particularly preferable.

Component (A) is different from component (B) and has a chain polysiloxane molecular structure. For example, component (A) is preferably a straight chain or partially branched straight chain and may partially include a cyclic three-dimensional network. Preferably, the main chain consists of repeating diorganosiloxane units and is preferably a straight-chain or branched-chain diorganopolysiloxane capped at both molecular terminals with triorganosiloxy groups. Note that the siloxane units which provide a branched-chain organopolysiloxane are T units or Q units described below.

The properties of component (A) at room temperature may be those of an oily or raw rubber-like substance, with the viscosity of component (A) being no lower than 50 mPa·s and particularly preferably no lower than 100 mPa·s at 25° C. In particular, when the organopolysiloxane composition according to the present invention is a solvent type, at least a portion of component (A) is (A1) a raw rubber-like alkenyl group-containing organopolysiloxane having a viscosity of no less than 100,000 mPa·s at 25° C. or having a plasticity (the thickness when a 1 kgf load applied for 3 minutes to a 4.2 g spherical sample at 25° C. was read up to $1/100$ mm and this value was multiplied by 100) within a range of from 50 to 200, more preferably within a range of from 80 to 180 as measured in accordance with the method as prescribed in JIS K6249.

Note that in order to prevent contact failure, etc., these alkenyl group-containing organopolysiloxanes preferably have volatile or low molecular weight siloxane oligomers (octamethyltetrasiloxane (D4), decamethylpentasiloxane (D5), etc.) reduced or eliminated. While the degree can be designed as desired, it may be less than 1% by mass of the total component (A), less than 0.1% by mass for each siloxane oligomer, and may be reduced to the vicinity of the detection limit as required.

Although the content of alkenyl groups in component (A1) is not particularly limited, from the perspective of the technical effects of the present invention, the content of the vinyl ($CH_2$=CH) portion in the alkenyl groups in component (A1) (hereinafter, referred to as the "vinyl content") is preferably within a range of from 0.005 to 0.400 mass % and particularly preferably within a range of from 0.005 to 0.300 mass %.

Even component (A) having a lower viscosity than the abovementioned component (A1) is available as component (A) of the present invention. Specifically, an organopolysiloxane (A2) containing alkenyl groups having a viscosity of less than 100,000 mPa·s at 25° C. is available. Here, examples other than the viscosity of component (A2) are the same as component (A1).

In terms of the technical effects of the present invention, 50 mass % or more of component (A) is preferably an alkenyl group-containing organopolysiloxane with a high degree of polymerization, which is component (A1), with 75 to 100 mass % thereof particularly preferably component (A1). That is, when component (A1) (=an alkenyl group-containing organopolysiloxane with a higher degree of polymerization) and component (A2) (=an alkenyl group-containing organopolysiloxane with a lower degree of polymerization) are used in combination as component (A) of the present invention, the mass ratios of both thereof range from 50:50 to 100:0, more suitably 75:25 to 100:0 or 75:25 to 90:10.

The organopolysiloxane resin mixture (B) is one of the characteristic configurations of the present invention and is a component which is an adhesion imparting component imparting adhesive force to a substrate while simultaneously achieving a storage elastic modulus at low temperatures and a practical adhesive force range (which are the object of the present invention) using the organopolysiloxane resin mixture in a constant ratio to component (A). More specifically, component (B) is a mixture of organopolysiloxane resins having different average molecular weights, wherein the content of hydroxyl groups or hydrolyzable groups is suppressed, and wherein a hydrolysis/polymerization reaction between components (B) tends not to occur, with the combined use of resins of different average molecular weights achieving a predetermined storage elastic modulus and practical adhesive force range in the pressure sensitive adhesive layer which is the cured product thereof.

Specifically, component (B) is an organopolysiloxane resin mixture containing the following components (b1) and (b2) at a mass ratio of 1:99 to 99:1:

(b1) an organopolysiloxane resin, wherein the total content of hydroxyl groups and hydrolyzable groups with respect to all silicon atoms in the molecule is 9 mole % or less, and the weight average molecular weight (Mw) measured in terms of standard polystyrene by gel permeation chromatography (GPC) is 4500 or more; and (b2) an organopolysiloxane resin, wherein the total content of hydroxyl groups and hydrolyzable groups with respect to all silicon atoms in the molecule is 9 mole % or less, and the weight average molecular weight (Mw) measured in terms of standard polystyrene by gel permeation chromatography (GPC) is less than 4500;

Regarding component (B), that is, components (b1) and (b2) according to the present invention, as a common property, the sum of the content of hydroxyl groups and hydrolyzable groups in the molecule is within a range of 9 mole % or less with respect to all silicon atoms in the organopolysiloxane resin molecule, preferably 7 mole % or less with respect to all silicon atoms in the molecule. Note that in component (B), the content of such hydroxyl groups and hydrolyzable groups can be expressed by converting all of these functional groups into hydroxyl groups. In this case, when the mass % is calculated assuming all of the hydrolyzable groups other than the hydroxyl groups in the organopolysiloxane resin molecule are hydroxyl groups (OH), the sum of the content of the abovementioned hydroxyl groups and hydrolyzable groups can be expressed such that the content of these hydrolyzable groups which are converted into hydroxyl groups and hydroxyl groups in the organopolysiloxane resin molecule is 2.0 mass % or less, preferably 1.6 mass % or less. The hydroxyl groups or hydrolysable groups are groups which are directly bonded to silicon of the T units or Q units, etc. among the siloxane units in the below-mentioned resin structure, and obtained by hydrolyzing the silane or silane derivative which is the raw material. Consequently, the content of hydroxyl groups or hydrolyzable groups can be reduced by hydrolyzing the synthesized organopolysiloxane resin with a silylating agent such as trimethylsilane.

In components (b1) and (b2), when the amount of the hydroxyl groups or hydrolyzable groups exceeds the abovementioned upper limit, the condensation reaction between the organopolysiloxane resin molecules proceeds, thereby facilitating the formation of an organopolysiloxane resin structure having a large molecular weight in the cured product. Such an organopolysiloxane resin having a high molecular weight tends to impair the curability of the overall composition, the curability of the composition at low temperatures may be insufficient, and the resulting pressure sensitive adhesive layer may not have sufficient storage elastic modulus for practical use.

Both components (b1) and (b2) are organopolysiloxane resins and are organopolysiloxanes having a three dimensional structure. Examples include a resin consisting of $R_2SiO_{2/2}$ units (D units) and $RSiO_{3/2}$ units (T units) (wherein, each R independently represents a monovalent organic group) and having a content of hydroxyl groups or hydrolyzable groups within the abovementioned range, a resin consisting of only T units and having a content of hydroxyl groups or hydrolyzable groups within the abovementioned range, and a resin consisting of $R_3SiO_{1/2}$ units (M units) and $SiO_{4/2}$ units (Q units) and having a content of hydroxyl groups or hydrolyzable groups within the abovementioned range. In particular, resin (also referred to as MQ resin) is preferably used which consists of $R_3SiO_{1/2}$ units (M units) and $SiO_{4/2}$ units (Q units), wherein the sum of the content of hydroxyl groups and hydrolyzable groups with respect to all silicon atoms in the molecule is 0 to 7 mole % (preferably within a range of 0.0 to 1.6 mass % when all of these functional groups are converted into hydroxyl groups).

The monovalent organic group of R is preferably a monovalent hydrocarbon group having a carbon number of from 1 to 10, with examples thereof including alkyl groups having a carbon number of from 1 to 10, alkenyl groups having a carbon number of from 2 to 10, aryl groups having a carbon number of from 6 to 10, cycloalkyl groups having a carbon number of from 6 to 10, benzyl groups, phenylethyl groups, and phenylpropyl groups. In particular, 90 mole % or more of R is preferably alkyl groups having 1 to 6 carbon atoms or phenyl groups, while 95 to 100 mole % of R is particularly preferably methyl groups or phenyl groups.

When components (b1) and (b2) are resins consisting of $R_3SiO_{1/2}$ units (M units) and $SiO_{4/2}$ units (Q units), the molar ratio of M units to Q units is preferably from 0.5 to 2.0. This is because when the molar ratio is less than 0.5, the adhesive force to the substrate may be diminished, whereas when the molar ratio is greater than 2.0, the cohesive strength of the material constituting the adhesive layer decreases. Moreover, D units and T units may also be included in component (B) to an extent that does not impair the characteristics of the present invention. Further, in order to prevent contact failure, etc., these organopolysiloxane resins may have a low molecular weight siloxane oligomer reduced or eliminated.

The organopolysiloxane resins which are components (b1) and (b2) differ from each other in terms of the weight average molecular weight (Mw) thereof. Here, the weight average molecular weight (Mw) is the average molecular weight, taking into consideration the proportion of each molecule in each organopolysiloxane resin measured in terms of standard polystyrene by gel permeation chromatography (GPC).

Component (b1) is an organopolysiloxane resin having a large molecular weight, wherein the weight average molecular weight (Mw) thereof is 4500 or more, preferably 5000 or more, and particularly preferably 5500 or more. In practical use, component (b1) is particularly suitably a resin containing the abovementioned $R_3SiO_{1/2}$ units (M units) and $SiO_{4/2}$ units (Q units), wherein the weight average molecular weight (Mw) is within a range of 5000 to 10000.

Component (b2) is an organopolysiloxane resin having a small molecular weight, wherein the weight average molecular weight (Mw) thereof is less than 4500, preferably 4000 or less, and particularly preferably 3750 or less. In practical use, component (b1) is particularly suitably a resin containing the abovementioned $R_3SiO_{1/2}$ units (M units) and $SiO_{4/2}$ units (Q units), wherein the weight average molecular weight (Mw) is within a range of 500 to 3750.

Component (B) is an organopolysiloxane resin mixture containing the abovementioned components (b1) and (b2) at a mass ratio of 1:99 to 99:1, wherein, while not particularly limited thereto, the mixing ratio thereof may be within a range of 5:95 to 95:5, within a range of 30:70 to 95:5, or within a range of 35:65 to 95:5. In contrast, the present invention is characterized by substantially combining two or more types of resin components having different molecular weights, wherein, if component (B) is not a mixture of organopolysiloxane resins having different molecular weights or if the mixing ratio is outside the upper and lower limits, even if the content of the hydroxyl groups or hydrolyzable groups of the resin component is no greater than 2.0 mass %, the intended characteristics such as curability, cohesive strength, and storage elastic modulus according to the present invention may not be achieved.

[Mass Ratio of Component (B) to Component (A)]

The pressure sensitive adhesive layer-forming organopolysiloxane composition according to the present invention characteristically has a mass ratio of component (B) (which is an organopolysiloxane resin) to component (A) (which is a chain reactive siloxane component) within a range of 0.9 to 2.0. This is because, when the abovementioned characteristic organopolysiloxane resin mixture is selected as component (B), and the abovementioned resin component is blended so as to be within the abovementioned range with respect to the chain siloxane polymer component, the intended characteristics such as curability, cohesive strength, and storage elastic modulus of the present invention are suitably achieved. Specifically, the mass ratio of component (B) to component (A) may be within a range of 1.0 to 1.9. In contrast, when the mass ratio of component (B) to component (A) is outside the abovementioned range, the intended characteristics such as curability, cohesive strength, storage elastic modulus, etc. according to the present invention may not be achieved even when other configurations are adjusted.

Component (C) is an organohydrogenpolysiloxane having two or more Si—H bonds in the molecule and is a crosslinking agent of the organopolysiloxane composition of the present invention. The molecular structure of component (C) is not particularly limited, with examples thereof including a straight chain, a partially branched straight chain, a branched chain, a cyclic, or an organopolysiloxane resin structure, and with a straight chain, a partially branched straight chain, or an organopolysiloxane resin structure being preferable. The bonding position of silicon-bonded hydrogen atoms is not particularly limited, with examples thereof including molecular terminals, side chains, and both molecular terminals and side chains.

The content of the silicon-bonded hydrogen atoms is preferably from 0.1 to 2.0 mass % and more preferably from 0.5 to 1.7 mass %.

Exemplary silicon-bonded organic groups include: alkyl groups having 1 to 8 carbon atoms such as methyl groups, ethyl groups, propyl groups, butyl groups, and octyl groups; aryl groups such as phenyl groups and tolyl groups; aralkyl groups such as benzyl groups and phenethyl groups; and halogenated alkyl groups such as 3-chloropropyl groups and 3,3,3-trifluoropropyl groups, wherein 50% moles or more of the total number thereof are preferably alkyl groups having 1 to 8 carbon atoms or phenyl groups. From the perspective of ease of manufacture and compatibility with the preferred components (A) and (B) described above, the other organic groups are preferably methyl groups or phenyl groups.

When component (C) of the present invention is an organohydrogenpolysiloxane, which is an organopolysiloxane resin, examples thereof include: organopolysiloxane copolymers consisting of siloxane units represented by the general formula: $R'_3SiO_{1/2}$, siloxane units represented by the general formula $R'_2HSiO_{1/2}$, and siloxane units represented by the formula: $SiO_{4/2}$; organopolysiloxane copolymers consisting of siloxane units represented by the general formula: $R'_2HSiO_{1/2}$ and siloxane units represented by the formula: $SiO_{4/2}$; organopolysiloxane copolymers consisting of siloxane units represented by the general formula: $R'_2HSiO_{1/2}$ and siloxane units represented by the formula: $R''SiO_{3/2}$; organopolysiloxane copolymers consisting of siloxane units represented by the general formula: $R'HSiO_{2/2}$, siloxane units represented by the general formula: $R'SiO_{3/2}$, or siloxane units represented by the formula: $HSiO_{3/2}$; and mixtures of two or more types of these organopolysiloxanes. Note that R' in the formulas is an alkyl group having a carbon number of from 1 to 8, an aryl group, an aralkyl group, or a halogenated alkyl group, with examples thereof being the same as those described above.

Specific examples of component (C) include tris(dimethylhydrogensiloxy)methylsilane, tetra(dimethylhydrogensiloxy)silane, methylhydrogenpolysiloxanes capped at both terminals with trimethylsiloxy groups, dimethylsiloxane/ methylhydrogensiloxane copolymers capped at both terminals with trimethylsiloxy groups, dimethylsiloxane/methylhydrogensiloxane copolymers capped at both terminals with dimethylhydrogensiloxy groups, cyclic methylhydrogen oligosiloxanes, cyclic methylhydrogensiloxane/dimethylsiloxane copolymers, methylhydrogensiloxane/diphenylsiloxane copolymers capped at both molecular terminals with trimethylsiloxy groups, methylhydrogensiloxane/diphenylsiloxane/dimethylsiloxane copolymers capped at both molecular terminals with trimethylsiloxy groups, hydrolytic condensates of trimethylsilanes, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units, and $(C_6H_5)SiO_{3/2}$ units, copolymers consisting of $(CH_3)_2HSiO_{1/2}$ units and $CH_3SiO_{3/2}$ units, and mixtures of two or more types thereof.

In the case of a straight-chain structure, in particular, a methylhydrogenpolysiloxane represented by the molecular structural formula:

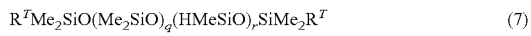  (7)

(wherein, Me is a methyl group, $R^T$ is a methyl group or a hydrogen atom, and q and r are numbers satisfying $0.3 \leq r/(q-r) \leq 1$ and $5 \leq (q+r) \leq 200$) is preferable. Note that component (C) may use two or more different types in combination.

Similarly, the following such organosiloxanes may be given as examples. Note that in the formulas, Me and Ph respectively represent a methyl group and a phenyl group, m is an integer from 1 to 100, n is an integer from 1 to 50, and b, c, d, and e are each positive numbers, wherein the sum of b, c, d, and e in one molecule is 1.

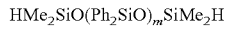

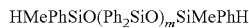

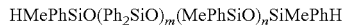

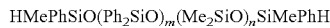

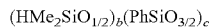

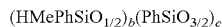

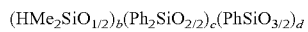

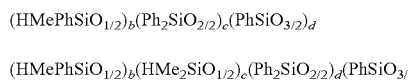

[SiH/Vi Ratio]

The composition according to the present invention is hydrosilylation reaction curable, with the usage amount of component (C) not particularly limited as long as the composition can sufficiently cure via a hydrosilylation reaction. However, the amount of silicon atom-bonded hydrogen atoms (SiH) groups in component (C) with respect to the sum of the amount (substance amount) of alkenyl groups in component (A) and the amount (substance amount) of alkenyl groups in component (B) in the composition, that is, the molar ratio, is preferably within a range of 0.1 to 100, but may be within a range of 0.5 to 60, within a range of 1.0 to 50, or within a range of 1.0 to 40.

In contrast, in order to improve adhesion to a substrate of glass, etc., the amount of SiH groups can be designed so as to be 10 or more and 20 or more, preferably more than 20, and more preferably 22 or more. For example, the substance amount of silicon atom-bonded hydrogen atoms (SiH) groups in component (C) with respect to the sum of the amount (substance amount) of alkenyl groups in component (A) and the amount (substance amount) of alkenyl groups in component (B) in the composition can be designed so as to be in a range of 20 to 60 or a range of 22 to 50. When the amount of the SiH groups falls below the abovementioned lower limit, the technical effect of improving adhesion to the substrate may not be achieved. In contrast, when the amount of the SiH groups exceeds the abovementioned upper limit, the amount of unreacted residual curing agent becomes large, potentially having adverse effects on curing physical properties such as the brittleness of the cured product or potentially causing problems such as gas generation. However, a pressure sensitive adhesive layer can be formed which is sufficient for practical use even when the SiH/Vi ratio of the composition is outside the abovementioned range.

[Hydrosilylation Reaction Catalyst]

The organopolysiloxane composition of the present invention contains a hydrosilylation reaction catalyst. Examples of hydrosilylation reaction catalysts include platinum-based catalysts, rhodium-based catalysts, and palladium-based catalysts, with platinum-based catalysts being preferable in that they markedly accelerate the curing of the present composition. Examples of this platinum based catalyst include platinum fine powder, chloroplatinic acid, an alcohol solution of chloroplatinic acid, a platinum-alkenyl siloxane complex, a platinum-olefin complex, and a platinum-carbonyl complex, with a platinum-alkenyl siloxane complex particularly preferable. Examples of this alkenyl siloxane include 1,3-divinyl-1,1,3,3-tetramethyldisiloxane, 1,3,5,7-tetramethyl-1,3,5,7-tetravinylcyclotetrasiloxane, alkenyl siloxanes in which some of the methyl groups of these alkenyl siloxanes are substituted with groups selected from the group consisting of nitriles, amides, dioxolanes, and sulfolanes, ethyl groups, phenyl groups, or the like, and alkenyl siloxanes in which the vinyl groups of these alkenyl siloxanes are substituted with allyl groups, hexenyl groups, or the like. In particular, 1,3-divinyl-1,1,3,3-tetramethyldisiloxane is preferable because the platinum-alkenyl siloxane complex has good stability. As the catalyst for promoting the hydrosilylation reaction, a non-platinum based metal catalyst such as iron, ruthenium, iron/cobalt, or the like may be used.

While the content of the hydrosilylation reaction catalyst is not particularly limited thereto in the present invention, the amount of the platinum based metal with respect to the total amount of solids in the composition is within a range of 0.1 to 200 ppm, but may be within a range of 0.1 to 150 ppm, within a range of 0.1 to 100 ppm, or within a range of 0.1 to 50 ppm. Here, the platinum-based metal is a metal element of group VIII consisting of platinum, rhodium, palladium, ruthenium, and iridium; however, in practical use, the content of the platinum-metal excluding the ligands of the hydrosilylation catalyst is preferably within the range described above. Note that the solid content is a component that forms the cured layer (primarily a main agent, an adhesion-imparting component, a crosslinking agent, a catalyst, and other non-volatile components) when the organopolysiloxane composition of the present invention is subjected to a curing reaction and does not include volatile components such as solvents that volatilize at the time of heat curing.

When the content of the platinum based metal in the organopolysiloxane composition according to the present invention is 50 ppm or less (45 ppm or less, 35 ppm or less, 30 ppm or less, 25 ppm or less, or 20 ppm or less), this may suppress discoloration or coloration of the transparent pressure-sensitive adhesive layer, in particular, after curing or when heated or exposed to high-energy rays such as UV rays. Meanwhile, from the perspective of the curability of the organopolysiloxane composition, the content of the platinum-based metal is no lower than 0.1 ppm, because when the content is lower than this lower limit, this may cause curing defects.

Component (E) is a curing retarder and is compounded in order to suppress crosslinking reactions between the alkenyl groups in the composition and the SiH groups in component (C) so as to extend the usable life at ordinary temperatures and enhance the storage stability. Accordingly, in practical use, the component is nearly essential to the pressure sensitive adhesive layer-forming organopolysiloxane composition according to the present invention.

Specific examples of component (E) include acetylenic compounds, ene-yne compounds, organic nitrogen compounds, organic phosphorus compounds, and oxime compounds. Specific examples include: alkyne alcohols such as 3-methyl-1-butyne-3-ol, 3,5-dimethyl-1-hexyne-3-ol, 3-methyl-1-pentyne-3-ol, 1-ethynyl-1-cyclohexanol, phenyl butanol, and the like; ene-yne compounds such as 3-methyl-3-pentene-1-yne, 3,5-dimethyl-1-hexyne-3-yne, and the like; methylalkenylcyclosiloxanes such as 2-ethynyl-4-methyl-2-pentene, 1,3,5,7-tetramethyl-1,3,5,7-tetravinylcyclotetrasiloxane, 1,3,5,7-tetramethyl-1,3,5,7-tetrahexenyl-cyclotetrasiloxane, and the like, as well as benzotriazoles.

From the perspective of the curing behavior of the composition, the pressure sensitive adhesive layer-forming organopolysiloxane composition of the present invention is preferably curable at 80 to 200° C., with an increase in viscosity of 1.5-fold after 8 hours at room temperature following the preparation of the composition. The suppression of thickening is important from the perspective of handleability, pot life, and characteristics after curing and contains a large excess of component (C), wherein, even if the content of the platinum-based metal is optionally low, the curability can be ensured by curing at high temperatures of at least a certain temperature (80 to 200° C.). Note that such a composition can be realized by selecting a suitable combination and compounded amounts of each of the components described above, the hydrosilylation catalyst, and component (E).

In addition to the preferred components (A) and (B) described above, the organopolysiloxane composition of the present invention may also contain an organic solvent as a solvent. The type and blending amount of the organic solvent is adjusted taking the coating workability, etc. into consideration. Exemplary organic solvents include: aromatic hydrocarbon-based solvents such as toluene, xylene, and benzene; aliphatic hydrocarbon-based solvents such as heptane, hexane, octane, and isoparaffin; ester-based solvents such as ethyl acetate and isobutyl acetate; ether-based solvents such as diisopropyl ether and 1,4-dioxane; chlorinated aliphatic hydrocarbon-based solvents such as trichloroethylene, perchloroethylene, and methylene chloride; and solvent volatile oils, with two or more types capable of being combined in accordance with the wettability of the sheet-like substrate or the like. A compounded amount of the organic solvent is preferably an amount such that a mixture of components (A) to (C) can be uniformly applied to a sheet-like substrate surface. For example, the compounded amount may be from 5 to 3000 parts by mass per total of 100 parts by mass of components (A), (B), and (C).

The organopolysiloxane composition of the present invention may optionally contain components other than the components described above to an extent that does not impair the technical effects of the present invention. For example, the composition may contain: an adhesion promoter; a non-reactive organopolysiloxane such as a polydimethylsiloxane or a polydimethyldiphenylsiloxane; an antioxidant such as a phenol-type, a quinone-type, an amine-type, a phosphorus-type, a phosphite-type, a sulfur-type, or a thioether-type antioxidant; a flame retardant such as a phosphate ester-type, a halogen-type, a phosphorus-type, or an antimony-type flame retardant; and one or more types of antistatic agents consisting of a cationic surfactant, an anionic surfactant, a non-ionic surfactant, or the like. Note that, in addition to these components, pigments, dyes, inorganic microparticles (reinforcing fillers, dielectric fillers, conductive fillers, thermally conductive fillers), etc. can be optionally blended.

[(A') Chain Organopolysiloxane which does not Contain a Carbon-Carbon Double Bond-Containing Reactive Group in the Molecule]

The organopolysiloxane composition according to the present invention can blend a non-reactive organopolysiloxane such as a polydimethylsiloxane or polydimethyldiphenylsiloxane that does not contain a carbon-carbon double bond-containing reactive group such as an alkenyl group, acryl group, or methacryl group. As a result, it may be possible to improve the loss coefficient (tan δ), storage elastic modulus (G'), and loss modulus (G") of the below-mentioned pressure sensitive adhesive layer. For example, the loss coefficient of the pressure sensitive adhesive layer can be increased using a polydimethylsiloxane or polydimethyldiphenylsiloxane having a hydroxyl group terminal, with such compositions included within the scope of the present invention.

The method of preparing the organopolysiloxane composition of the present invention is not particularly limited and is performed by homogeneously mixing the respective components. A solvent may be added as necessary and the composition may be prepared by mixing at a temperature of from 0 to 200° C. using a known stirrer or kneader.

The organopolysiloxane composition of the present invention forms a coating film when applied to a substrate and forms a cured product by heating under temperature conditions of from 80 to 200° C. and preferably under temperature conditions of from 90 to 190° C. Examples of application methods include gravure coating, offset coating, offset gravure, roll coating, reverse roll coating, air knife coating, curtain coating, and comma coating.

[Range of Pressure Sensitive Adhesion and Adhesive Force]

The organopolysiloxane composition of the present invention is characterized in that a cured layer obtained by curing the composition by a hydrosilylation reaction is a pressure sensitive adhesive. Because the pressure sensitive adhesive layer according to the present invention has the abovementioned configuration and expresses sufficient adhesive force for practical use, a known silicone pressure sensitive adhesive can be replaced and used as desired.

Specifically, a pressure sensitive adhesive layer can be designed such that the adhesive force of the pressure sensitive adhesive layer having a thickness of 50 μm obtained by curing the organopolysiloxane composition according to the present invention, as measured at a tensile speed of 300 mm/min using a 180° peeling test method according to JIS Z 0237 for a polymethyl methacrylate sheet having a thickness of 2 mm, is within a range of 360 to 1700 gf/inch, with a pressure sensitive adhesive layer having an adhesive force within a range of 400 to 1400 gf/inch being suitable. Note that the thickness (50 μm) described above is the thickness of the cured layer itself serving as a reference for objectively defining the adhesive force of the cured layer of the present invention. It goes without saying that the organopolysiloxane composition of the present invention is not limited to a thickness of 50 μm and may be used as a cured layer or a pressure sensitive adhesive layer of any thickness.

[Storage Elastic Modulus and Other Viscoelasticity]

The pressure sensitive adhesive layer-forming organopolysiloxane composition according to the present invention has a shear storage elastic modulus G' at −20° C. of a pressure sensitive adhesive layer (obtained by curing thereof) within a range of 0.01 to 0.75 MPa, the storage elastic modulus G' may be within a range of 0.02 to 0.71 MPa, and those within a range of 0.03 to 0.68 MPa are also suitably included in the scope of the present invention. The pressure sensitive adhesive layer-forming organopolysiloxane composition according to the present invention, which has a storage elastic modulus G' at low temperatures along with the abovementioned practical adhesive force, is suitable as a member of an electronic device or an electrical device (such as a speaker or transducer) and suitable for applications in the field of advanced electronics materials and display elements such as smart devices, in order to form an elastic adhesive member.

The storage elastic modulus (G') of the pressure sensitive adhesive layer according to the present invention can be measured via a known measurement method. For example, measurements can be carried out using a storage elastic modulus (G') MCR301 viscoelastic measurement device (available from Anton Paar). Using a disk shaped sample with a diameter of approximately 8 mm and a thickness of approximately 0.5 to 1 mm, the value can be measured as a value at −20° C. within a range of −40° C. to 100° C., which is the usage temperature, utilizing an 8 mm parallel plate at a frequency of 1 Hz, a strain of 0.1%, and a temperature rising rate of 3° C./minute.

The pressure sensitive adhesive layer according to the present invention may have a storage elastic modulus G' at 1.0 Hz at −20° C. which is no less than three-fold the storage elastic modulus G' at 1.0 Hz at 25° C.

[Properties Relating to Transparency, Color Tone, or Coloration and Discoloration of the Pressure Sensitive Adhesive Layer]

The organopolysiloxane composition according to the present invention may be substantially transparent, translucent, or opaque, such that the transparency thereof can be designed in accordance with the application of the pressure sensitive adhesive layer. For example, as a pressure-sensitive adhesive layer for a display device, a film-like cured product with a thickness of from 10 to 1000 μm obtained by curing the organopolysiloxane composition of the present invention is preferably visually transparent and preferably does not contain a coloring additive such as carbon black. Note that when it is visually transparent, or more objectively, when the value for air is 100%, the transmittance of light at a wavelength of 450 nm of the pressure sensitive adhesive layer for a display device formed from a cured layer having a thickness of 100 μm is 80% or higher and suitably 90% or higher, and may be designed so as to be 95% or higher. In contrast, in the adhesion, etc. of the electrical or electronic part which does not require light transmittance, a semi-transparent to opaque pressure sensitive adhesive layer may be used, with a filler component or additive which impairs colorability or light transmittance capable of being used depending on the required characteristics other than light transmittance.

The organopolysiloxane composition according to the present invention can be designed such that the cured product is not colored, in addition to the abovementioned transparency, by optionally reducing the content of the platinum based metal in the cured layer. Specifically, the b* value, which is measured with the L*a*b* color system as prescribed in JIS Z 8729, immediately after curing a cured layer having a thickness of 100 μm obtained by curing the organopolysiloxane composition of the present invention can be designed so as to be no greater than 0.15 and no greater than 0.10. Having such b* values means that the cured layer is substantially transparent and not yellow colored.

Even when the cured layer of the present invention is exposed to high temperatures or high-energy beams such as UV rays for an extended period of time, it can be designed such that the color tone thereof does not change significantly and the problem of yellowing, in particular, does not occur. Specifically, even if any of the following evaluations are made, the change (Δb*) in the b* value measured with the L*a*b* color system as prescribed in JIS Z 8729 immediately after evaluation, for a cured layer having a thickness of 100 μm obtained by curing the organopolysiloxane composition of the present invention, can be designed so as to be no greater than 0.20 and preferably no greater than 0.15. Note that Δb* is an absolute value of the numerical change.

(1) Thermal aging evaluation: The cured layer is aged for 300 hours at 105° C.
(2) High-energy beam irradiation: A sample of the cured layer is irradiated for 75 hours at room temperature with UV light using a mercury lamp (for example, Optical ModuleX or the like manufactured by Ushio Electric Co., Ltd.) having an intensity of 12 mW/cm² at 365 nm and an intensity of 3.5 mW/cm² at 254 nm.

[Use as a Pressure Sensitive Adhesive Layer]

The cured product of the present invention can, in particular, be used as a pressure sensitive adhesive layer. In addition, in order to improve adhesion with the adherend, surface treatments such as primer treatment, corona treatment, etching treatment, or plasma treatment may be performed on the surface of the pressure sensitive adhesive layer or the substrate. However, because the pressure sensitive adhesive layer according to the present invention has excellent adhesion to a substrate of a display device, etc. as described above, these steps may be added, as required, to further improve adhesion with the adherend, with a higher production efficiency capable of being achieved by eliminating these steps.

The curable organopolysiloxane composition of the present invention is cured by applying the composition to a release liner, then heating under the temperature conditions described above, and, after the release liner is peeled off and the composition is attached to a film-like substrate, a tape-like substrate, or a sheet-like substrate (hereinafter, referred to as a "film-like substrate") or applied to a film-like substrate, curing by heating at the temperature conditions described above so as to form a pressure sensitive adhesive layer on the surface of the substrate. A laminate provided with a cured layer, in particular, a film-like pressure sensitive adhesive layer, obtained by curing the organopolysiloxane composition of the present invention on these film-like substrates may be used for adhesive tapes, adhesive bandages, low-temperature supports, transfer films, labels, emblems, and decorative or explanatory signs. Further, a cured layer obtained by curing the organopolysiloxane composition of the present invention may be used to assemble automobile parts, toys, electronic circuits, or keyboards. Alternatively, a cured layer formed by curing the organopolysiloxane composition of the present invention, particularly a film-like pressure sensitive adhesive layer, may be used in the construction and use of a laminated touch screen or flat panel display.

Exemplary types of substrates include: paperboard, cardboard paper, clay-coated papers, polyolefin laminate papers, particularly polyethylene laminate papers, synthetic resin films and sheets, natural fiber woven materials, synthetic fiber woven materials, artificial leather woven materials, and metal foils. In particular, synthetic resin films and sheets are preferable, with exemplary synthetic resins including: polyimides, polyethylenes, polypropylenes, polystyrenes, polyvinyl chlorides, polyvinylidene chlorides, polycarbonates, polyethylene terephthalates, cyclopolyolefins, and nylons. When heat resistance is required, a heat-resistant synthetic resin film such as a polyimide, polyetheretherketone, polyethylene naphthalate (PEN), liquid crystal polyacrylate, polyamide-imide, polyether sulfone, and the like is particularly preferable. Meanwhile, for applications such as a display device in which visibility is required, a transparent substrate and specifically a transparent material such as a polypropylene, polystyrene, polyvinylidene chloride, polycarbonate, polyethylene terephthalate, PEN, and the like is preferable.

The substrate is preferably a film-like or a sheet-like substrate. The thickness thereof is not particularly limited and can be designed with a desired thickness in accordance with the application. Furthermore, in order to improve adhesion between a supporting film and pressure sensitive adhesive layer, a supporting film subjected to a primer treatment, corona treatment, etching treatment, or plasma treatment may be used. Furthermore, the opposite surface of the film-like substrate from the pressure sensitive adhesive layer surface may be subjected to surface treatments such as a treatment for scratch prevention, grime prevention, fingerprint adhesion prevention, anti-glare, anti-reflection, anti-static, or other treatment.

As the application method to the substrate, gravure coating, offset coating, offset gravure, roll coating using an offset transfer roll coater, reverse roll coating, air knife coating, curtain coating using a curtain flow coater or the like, comma coating, meyer bar, or other known methods used for the purpose of forming a cured layer may be used without limitation.

The coating amount can be designed at a desired thickness in accordance with the application such as a display device; for example, the thickness of the pressure sensitive adhesive layer after curing may be from 1 to 1000 μm, from 5 to 900 μm, or from 10 to 800 μm; however, there is no limitation thereto.

The pressure sensitive adhesive layer according to the present invention may be a single layer or a multilayer structure obtained by laminating two or more pressure sensitive adhesive layers, in accordance with the required characteristics. Multiple pressure sensitive adhesive layer may be formed by bonding the pressure sensitive adhesive films (which are formed film by film) thereto, or the step of applying and curing the pressure sensitive adhesive layer-forming organopolysiloxane composition may be carried out multiple times on a film substrate (including a release layer), etc.

The pressure sensitive adhesive layer according to the present invention may serve as other functional layers selected from a dielectric layer, conductive layer, heat dissipation layer, insulating layer, reinforcing layer, etc., in addition to providing adhering or sticking functions between members.

When the cured layer obtained by curing the organopolysiloxane composition of the present invention is a pressure sensitive adhesive layer, in particular, a pressure sensitive adhesive layer, the cured layer is preferably treated as a laminate film that is peelably adhered to a film substrate provided with a release layer having a release-coating capability. The release layer may also be referred to as a release liner, a separator, a release layer, or a release coating layer, and may preferably be a release layer having a release coating ability such as a silicone-based release agent, a fluorine-based release agent, an alkyd-based release agent, or a fluorosilicone-based release agent, or it may be formed as a substrate itself which is not prone to adhering to the resin sheet for a pressure sensitive adhesive layer of the present invention by forming physically fine irregularities in the surface of the substrate. In particular, in the laminated body according to the present invention, a release layer obtained by curing a fluorosilicone release agent is preferably used as the release layer.

The cured product obtained by curing the organopolysiloxane composition according to the present invention has both viscoelasticity and adhesive strength as described above, making it useful as a member of various types of electronic equipment or electrical devices as elastic adhesive members. In particular, it is useful as an electronic material, a member for a display device, or a member for a transducer (including sensors, speakers, actuators, and generators), with a suitable application for the cured product being a member for an electronic part or a display device. The cured product according to the present invention may be transparent or opaque, wherein, in particular, a film-shaped cured product, particularly a substantially transparent pressure sensitive adhesive film, is suitable as a member for a display panel or a display, and is particularly useful in so-called touch panel applications in which a device, particularly an electronic device, can be operated by touching a screen with a fingertip or the like. Moreover, the opaque elastic adhesive layer is not required to have transparency, making it particularly useful for applications of film-like or sheet-like members used in sensors, speakers, actuators, etc. which require constant elasticity or flexibility in the adhesive layer itself.

In particular, the pressure sensitive adhesive layer obtained by curing the organopolysiloxane composition according to the present invention is capable of achieving a pressure sensitive adhesive characteristic equivalent to conventional silicone pressure sensitive adhesive layers, and can improve adhesion to a substrate of a display device, etc. without causing problems due to poor curing or reduced curability.

[Member for Display Panel or Display]

A cured product obtained by curing the organopolysiloxane composition of the present invention can be used in the construction and use of a laminated touch screen or flat panel display, with the specific method of use thereof capable of being a known method of use of a pressure sensitive adhesive layer (in particular, silicone PSA) without any particular limitation.

For example, a cured product obtained by curing the organopolysiloxane composition of the present invention can be used in the production of a display device such as a touch panel as an optically transparent silicone-based pressure sensitive adhesive film or an adhesive layer disclosed in Unexamined Japanese Translation of International Application No. 2014-522436 or Unexamined Japanese Translation of International Application No. 2013-512326 described above. Specifically, the cured product obtained by curing the organopolysiloxane composition of the present invention can be used as the adhesive layer or adhesive film described in Unexamined Japanese Translation of International Application No. 2013-512326 without any particular limitation.

As an example, the touch panel according to the present invention may be a touch panel including a substrate such as a conductive plastic film having a conductive layer formed on one surface, with a cured layer obtained by curing the curable organopolysiloxane composition of the present invention, which is attached to a surface on the side on which the conductive layer is formed or on the opposite side thereof. The substrate is preferably a sheet-like or film-like substrate, with an example thereof being a resin film or a glass plate. In addition, the conductive plastic film may be a resin film or a glass plate, in particular, a polyethylene terephthalate film, having an ITO layer formed on one surface thereof. These are disclosed in JP 2013-512326 W and the like described above.

In addition, a cured product obtained by curing the organopolysiloxane composition of the present invention may be used as an adhesive film for a polarizing plate used in the production of a display device such as a touch panel, or may be used as a pressure sensitive adhesive layer used in bonding between a touch panel and a display module described in Japanese Unexamined Patent Application Publication No. 2013-065009.

INDUSTRIAL APPLICABILITY

Applications of the curing reactive organopolysiloxane composition and a cured product obtained by curing the same according to the present invention are in no way limited to the disclosure above, with a pressure sensitive adhesive film provided with a cured product obtained by curing the composition capable of being used in various display devices for displaying characters, symbols, and images such as television receivers, computer monitors, monitors for personal digital assistants, monitoring monitors, video cameras, digital cameras, mobile phones, personal digital assistants, displays for instrument panels of automobiles or the like, displays for instrument panels of various equipment, devices, and instruments, automatic ticket machines, automated teller machines, on-board display devices, and on-board transmission screens. The surface shape of such a display device may be a curved shape or a bowed shape rather than a flat surface, with examples thereof including curved displays or curved transmission screens used in automobiles (including electric vehicles), aircraft, or the like in addition to various flat panel displays (FPDs). Further, these display devices can display icons for executing functions or programs on a screen or display, notification indicators of e-mail, programs, or the like, and operation buttons for various devices such as car navigation devices, audio devices, and air conditioning devices, with touch panel functions enabling input operations capable of being added by touching these icons, notification indicators, or operation buttons with a finger. Application is possible as a device for CRT displays, liquid crystal displays, plasma displays, organic EL displays, inorganic EL displays, LED displays, surface electrolytic displays (SEDs), field emitting displays (FEDs), and other displaying devices, or touch panels using the displaying devices. Moreover, the cured product obtained by curing the composition has excellent adhesion and viscoelastic characteristics, enabling the use thereof as a film-like or sheet-like member which is a member for transducers such as a membrane for speakers (including a sensor, speaker, actuator, etc.), in addition to also being capable of being used as a sealing layer or adhesive layer used in a secondary battery, fuel cell, or solar cell module.

A pressure sensitive adhesive layer obtained by curing the organopolysiloxane composition according to the present invention may be substantially transparent, without causing problems such as poor curing or reduced curability, and has excellent adhesion to substrates of various display devices, etc. Therefore, the pressure sensitive adhesive layer can be suitably used in a vehicle display device with good visibility and operability of the display content over an extended period of time, and in particular, a vehicle display device having a curved screen or curved display and optionally equipped with a touch panel function. For example, vehicle display devices equipped with curved display surfaces are disclosed in Japanese Unexamined Patent Application Publication No. 2017-047767, Japanese Unexamined Patent Application Publication No. 2014-182335, Japanese Unexamined Patent Application Publication No. 2014-063064, Japanese Unexamined Patent Application Publication No. 2013-233852, and the like; however, the pressure sensitive adhesive layer of the present invention can be suitably applied or replaced as part or all of an adhesive layer or a pressure sensitive adhesive layer for which transparency is required in these documents. Further, it goes without saying that regarding the pressure sensitive adhesive layer-forming organopolysiloxane composition according to the present invention, currently used adhesive layers or pressure sensitive adhesive layers requiring transparency may be used as a substitute for other known curved display devices as well, and in order to further leverage the advantages of the pressure sensitive adhesive of the present invention, it is preferable to adjust the design of the display device or the thickness of the member using known techniques.

Note that the transparent film-like substrate provided with the pressure sensitive adhesive layer of the present invention may be used for the purpose of scratch prevention, dirt prevention, fingerprint adhesion prevention, static prevention, glare prevention, peep prevention, and the like of these display surfaces.

EXAMPLES

Examples of the present invention and comparative examples are described hereinafter. Note that "cured" in each of the examples, comparative examples, and reference examples means that each composition has fully cured under the respective curing conditions.
(Preparation of Curing Reactive Organopolysiloxane Composition)

The curing reactive organopolysiloxane compositions illustrated in each of the examples, comparative examples, and reference examples were prepared using the components shown in Table 1. Note that all percentages in Table 1 refer to percentage by mass.
(Measurement of the Molecular Weight of the Organopolysiloxane Component)

Using gel permeation chromatography (GPC) available from Waters and tetrahydrofuran (THF) as a solvent, the weight average molecular weight (Mw) and number average molecular weight (Mn) of organopolysiloxane components such as organopolysiloxane resin were determined in terms of standard polystyrene.

(Measurement of the Content of Hydroxyl Groups (OH) in Organopolysiloxane Resin)

Using an ACP-300²⁹ Si NMR spectrometer available from Bruker equipped with a glass-free probe, when the chemical shift of the tetramethylsilane was set to 0 ppm, the molar content was obtained from the presence ratio of $Si(OH)O_{2/3}$ units appearing at −93 to −103.5 ppm to all silicon atoms, then further converted into the mass % of the hydroxyl groups (OH) in the organopolysiloxane resin. Note that hydrolyzable groups other than hydroxyl groups were not included in the organopolysiloxane resin in the following examples.

(Adhesive Force Measurement)

Each composition was applied to a PET film (available from Toray Co., Ltd., product name: Lumirror (registered trademark) S10, thickness: 50 μm) such that the thickness after curing was 50 μm, after which it was cured for 3 minutes at 150° C. After being left to stand for one day, the sample was cut to a width of 20 mm and the adhesive layer surface was affixed to a PMMA plate (manufactured by Paltec, ACRYLITE L001, 50×120×2 mm) using a roller to form a test piece. Regarding the test piece using the PMMA plate, the adhesive force (measurement at a width of 20 mm converted to the display unit gf/inch) was measured at a tensile speed of 300 mm/min using the 180° peeling test method in accordance with JIS Z 0237, using an RTC-1210 tensile tester manufactured by Orientec Co., Ltd.

(Dynamic Viscoelasticity: Storage Elastic Modulus G' at −20° C.)

Each composition was applied to a release liner coated via fluorosilicone release coating (such that the thickness after curing was approximately 100 μm), then cured at 150° C. for three minutes. Five or more of the pressure sensitive adhesive films were overlapped so as to obtain a film sample, both surfaces of which were sandwiched between release liners having a thickness of 500 μm or more. The film was cut to a diameter of 8 mm and adhered to the parallel plate probe of a dynamic viscoelastic device (MCR301 available from Anoton Paar) in order to determine the storage elastic modulus G'. The measurement conditions were within a range of −70° C. to 200° C., the measurements were carried out at a frequency of 1 Hz and a temperature rising rate of 3° C./minute, the loss coefficient, storage elastic modulus G', and loss modulus G" were measured, and the storage elastic modulus G' at −20° C. was recorded.

(Tensile Test)

A film sample having a thickness of 500 μm or more (obtained in the same manner as the abovementioned dynamic viscoelasticity test sample) with both surfaces sandwiched between release liners was cut to a width of approximately 5 mm and a length of approximately 70 mm, then the release liners were peeled off while applying baby powder to the adhesive surface to form a tensile test sample. The tensile test was carried out using Autograph AGS-X available from Shimadzu Corporation to grab approximately 25 mm above or below the sample at a speed of 300 mm/minute. Stress and strain were determined from the exact sample width and thickness of each sample and the distance between the crossheads.

The materials of the curing reactive organopolysiloxane compositions are shown in Table 1. Note that the viscosity or plasticity of each component was measured at room temperature using the following methods.

[Viscosity]

The viscosity (mPa·s) is a value measured using a rotary viscometer conforming to JIS K7117-1, while the kinematic viscosity (mm²/s) is a value measured with an Ubbelohde viscometer conforming to JIS Z8803).

[Plasticity]

The plasticity was expressed as a value measured in accordance with the method prescribed in JIS K 6249 (the thickness when a 1 kgf load was applied for 3 minutes to a 4.2 g spherical sample at 25° C. was read up to 1/100 mm, and this value was multiplied by 100).

Table 1: Components of the Curing Reactive Organopolysiloxane Compositions

TABLE 1

| Component | Component |
|---|---|
| Component a | Vinyl-functional polydimethylsiloxane, gum-like (plasticity: 152), vinyl content: 0.013 mass % |
| Component b1 | MQ silicone resin consisting of $(CH_3)_3SiO_{1/2}$ units, $SiO_{4/2}$ units, and hydroxyl groups, Mw: 6500, OH content: 4.5 mole % (1.0 mass %), xylene solution (solid content: 63.8%) |
| Component b2 | MQ silicone resin consisting of $(CH_3)_3SiO_{1/2}$ units, $SiO_{4/2}$ units, and hydroxyl groups, Mw: 3300, OH content: 3.5 mole % (0.8 mass %), xylene solution (solid content: 75.5%) |
| Component b' | MQ silicone resin consisting of $(CH_3)_3SiO_{1/2}$ units, $SiO_{4/2}$ units, and hydroxyl groups, Mw: 2600, OH content: 12.6 mole % (2.8 mass %), xylene solution (solid content: 68.3%) |
| Component c1 | Dimethylsiloxane-methylhydrogensiloxane copolymer capped with trimethylsiloxy groups at both terminals of a molecular chain, Mw: 1600, SiH content: 0.73% |
| Component c2 | Methylhydrogenpolysiloxane capped at both terminals of the molecular chain with trimethylsiloxy groups, viscosity: 20 mm²/s, SiH content: 1.59% |
| Component d1 | Platinum-based hydrosilylation reaction catalyst containing 0.62 mass % platinum |
| Component d2 | Platinum-based hydrosilylation reaction catalyst containing 0.52 mass % platinum |
| Component e1 | 1-ethynyl-1-cyclohexanol, 20% toluene solution |
| Component e2 | 3,5-Dimethyl-1-hexyne-3-ol |

Example 1

41.3 parts by weight of the vinyl functional polydimethylsiloxane of component a, 40.8 parts by weight of the MQ silicone resin of component b1, 43.2 parts by weight of the MQ silicone resin of component b2, 96.8 parts by weight of toluene, 0.808 parts by weight of the dimethyl siloxane/methylhydrogen siloxane copolymer capped at both terminals with trimethylsiloxy groups of component c1, and 0.577 parts by weight of the curing retarder 20% solution of component e1 were sufficiently mixed at room temperature, after which 0.484 parts by weight of the platinum based hydrosilylation reaction catalyst of component d1 was added to the mixture to form a curing reactive organopolysiloxane composition. The molar ratio (SiH/Vi ratio) of SiH groups in component (c1) to the amount of alkenyl groups in component (a) was 29.6, while the content of the platinum metal to the solid content was 30 ppm.

The composition was cured via the abovementioned method, after which the adhesive force, viscoelasticity, and stress strain on the PMMA plate were measured via the abovementioned method, the evaluation results, etc. of which were indicated in Table 2.

Example 2

41.3 parts by weight of the vinyl functional polydimethylsiloxane of component a, 38.6 parts by weight of the MQ silicone resin of component b1, 45.1 parts by weight of the MQ silicone resin of component b2, 97.1 parts by weight of toluene, 0.808 parts by weight of the dimethyl siloxane/methylhydrogen siloxane copolymer capped at both terminals with trimethylsiloxy groups of component c1, and 0.577 parts by weight of the curing retarder 20% solution of component e1 were sufficiently mixed at room temperature, after which 0.484 parts by weight of the platinum based hydrosilylation reaction catalyst of component d1 was added to the mixture to form a curing reactive organopolysiloxane composition. The molar ratio (SiH/Vi ratio) of SiH groups in component (c1) to the amount of alkenyl groups in component (a) was 29.6, while the content of the platinum metal to the solid content was 30 ppm.

The composition was cured via the abovementioned method, after which the adhesive force, viscoelasticity, and stress strain on the PMMA plate were measured via the abovementioned method, the evaluation results, etc. of which were indicated in Table 2.

Example 3

47.0 parts by weight of the vinyl functional polydimethylsiloxane of component a, 74.8 parts by weight of the MQ silicone resin of component b1, 7.03 parts by weight of the MQ silicone resin of component b2, 93.4 parts by weight of toluene, 0.889 parts by weight of the dimethyl siloxane/methylhydrogen siloxane copolymer capped at both terminals with trimethylsiloxy groups of component c1, and 0.577 parts by weight of the curing retarder 20% solution of component e1 were sufficiently mixed at room temperature, after which 0.484 parts by weight of the platinum based hydrosilylation reaction catalyst of component d1 was added to the mixture to form a curing reactive organopolysiloxane composition. The molar ratio (SiH/Vi ratio) of SiH groups in component (c1) to the amount of alkenyl groups in component (a) was 28.7, while the content of the platinum metal to the solid content was 30 ppm.

The composition was cured via the abovementioned method, after which the adhesive force, viscoelasticity, and stress strain on the PMMA plate were measured via the abovementioned method, the evaluation results, etc. of which were indicated in Table 2.

Comparative Example 1

32.1 parts by weight of the vinyl functional polydimethylsiloxane of component a, 29.1 parts by weight of the MQ silicone resin of component b1, 1.51 parts by weight of the MQ silicone resin of component b2, 29.4 parts by weight of toluene, 0.579 parts by weight of the dimethyl siloxane/methylhydrogen siloxane copolymer capped at both terminals with trimethylsiloxy groups of component c1, and 0.316 parts by weight of the curing retarder 20% solution of component e1 were sufficiently mixed at room temperature, after which 0.265 parts by weight of the platinum based hydrosilylation reaction catalyst of component d1 was added to the mixture to form a curing reactive organopolysiloxane composition. The molar ratio (SiH/Vi ratio) of SiH groups in component (c1) to the amount of alkenyl groups in component (a) was 27.4, while the content of the platinum metal to the solid content was 30 ppm.

The composition was cured via the abovementioned method, after which the adhesive force, viscoelasticity, and stress strain on the PMMA plate were measured via the abovementioned method, the evaluation results, etc. of which were indicated in Table 2.

Comparative Example 2

26.4 parts by weight of the vinyl functional polydimethylsiloxane of component a, 30.0 parts by weight of the MQ silicone resin of component b', 21.9 parts by weight of the MQ silicone resin of component b2, 67.9 parts by weight of toluene, 0.500 parts by weight of the dimethyl siloxane/methylhydrogen siloxane copolymer capped at both terminals with trimethylsiloxy groups of component c1, and 0.500 parts by weight of the curing retarder 20% solution of component e1 were sufficiently mixed at room temperature, after which 0.500 parts by weight of the platinum based hydrosilylation reaction catalyst of component d2 was added to the mixture to form a curing reactive organopolysiloxane composition. The molar ratio (SiH/Vi ratio) of SiH groups in component (c1) to the amount of alkenyl groups in component (a) was 28.7, while the content of the platinum metal to the solid content was 39.5 ppm.

The composition was cured via the abovementioned method, after which the adhesive force, viscoelasticity, and stress strain on the PMMA plate were measured via the abovementioned method, the evaluation results, etc. of which were indicated in Table 2.

Comparative Example 3

31.6 parts by weight of the vinyl functional polydimethylsiloxane of component a, 26.8 parts by weight of the MQ silicone resin of component b1, 68.0 parts by weight of the MQ silicone resin of component b2, 95.8 parts by weight of toluene, 0.737 parts by weight of the dimethyl siloxane/methylhydrogen siloxane copolymer capped at both terminals with trimethylsiloxy groups of component c1, and 0.577 parts by weight of the curing retarder 20% solution of component e1 were sufficiently mixed at room temperature, after which 0.577 parts by weight of the platinum based hydrosilylation reaction catalyst of component d2 was added to the mixture to form a curing reactive organopolysiloxane composition. The molar ratio (SiH/Vi ratio) of SiH groups in component (c1) to the amount of alkenyl groups in component (a) was 35.4, while the content of the platinum metal to the solid content was 30 ppm.

The composition was cured via the abovementioned method, after which the adhesive force, viscoelasticity, and stress strain on the PMMA plate were measured via the abovementioned method, the evaluation results, etc. of which were indicated in Table 2.

Comparative Example 4

43.1 parts by weight of the vinyl functional polydimethylsiloxane of component a, 89.2 parts by weight of the MQ silicone resin of component b1, 89.9 parts by weight of toluene, 0.834 parts by weight of the dimethyl siloxane/methylhydrogen siloxane copolymer capped at both terminals with trimethylsiloxy groups of component c1, and 0.577 parts by weight of the curing retarder 20% solution of component e1 were sufficiently mixed at room temperature, after which 0.484 parts by weight of the platinum based hydrosilylation reaction catalyst of component d1 was added to the mixture to form a curing reactive organopolysiloxane composition. The molar ratio (SiH/Vi ratio) of SiH groups in component (c1) to the amount of alkenyl groups in component (a) was 29.4, while the content of the platinum metal to the solid content was 30 ppm.

The composition was cured via the abovementioned method, after which the adhesive force, viscoelasticity, and stress strain on the PMMA plate were measured via the abovementioned method, the evaluation results, etc. of which were indicated in Table 2.

Comparative Example 5

36.4 parts by weight of the vinyl functional polydimethylsiloxane of component a, 99.8 parts by weight of the MQ silicone resin of component b1, 86.1 parts by weight of toluene, 0.737 parts by weight of the dimethyl siloxane/methylhydrogen siloxane copolymer capped at both terminals with trimethylsiloxy groups of component c1, and 0.577 parts by weight of the curing retarder 20% solution of component e1 were sufficiently mixed at room temperature, after which 0.484 parts by weight of the platinum based hydrosilylation reaction catalyst of component d1 was added to the mixture to form a curing reactive organopolysiloxane composition. The molar ratio (SiH/Vi ratio) of SiH groups in component (c1) to the amount of alkenyl groups in component (a) was 30.7, while the content of the platinum metal to the solid content was 30 ppm.

The composition was cured via the abovementioned method, after which the adhesive force, viscoelasticity, and stress strain on the PMMA plate were measured via the abovementioned method, the evaluation results, etc. of which were indicated in Table 2.

Reference Example 1

20.5 parts by weight of the vinyl functional polydimethylsiloxane of component a, 60.3 parts by weight of the MQ silicone resin of component b1, 19.2 parts by weight of toluene, 0.200 parts by weight of the methylhydrogen polysiloxane capped at both terminals with trimethylsiloxy groups of component c2, and 0.050 parts by weight of the curing retarder of component e2 were sufficiently mixed at room temperature, after which 0.200 parts by weight of the platinum based hydrosilylation reaction catalyst of component d1 was added to the mixture to form a curing reactive organopolysiloxane composition. The molar ratio (SiH/Vi ratio) of SiH groups in component (c2) to the amount of alkenyl groups in component (a) was 31.4, while the content of the platinum metal to the solid content was 22 ppm.

The composition was cured via the abovementioned method, after which the adhesive force, viscoelasticity, and stress strain on the PMMA plate were measured via the abovementioned method, the evaluation results, etc. of which were indicated in Table 2.

Reference Example 2

20.5 parts by weight of the vinyl functional polydimethylsiloxane of component a, 60.3 parts by weight of the MQ silicone resin of component b1, 19.2 parts by weight of toluene, 0.200 parts by weight of the methylhydrogen polysiloxane capped at both terminals with trimethylsiloxy groups of component c2, and 0.050 parts by weight of the curing retarder of component e2 were sufficiently mixed at room temperature, after which 0.200 parts by weight of the platinum based hydrosilylation reaction catalyst of component d1 was added to the mixture to form a curing reactive organopolysiloxane composition. The molar ratio (SiH/Vi ratio) of SiH groups in component (c2) to the amount of alkenyl groups in component (a) was 31.4, while the content of the platinum metal to the solid content was 22 ppm.

The composition was cured at 180° C. for 3 minutes, after which the adhesive force, viscoelasticity, and stress strain on the PMMA plate were measured via the abovementioned method, the evaluation results, etc. of which were indicated in Table 2.

TABLE 2

|  | B/A mass ratio | b1/b2 mass ratio | b'/b2 mass ratio | Storage elastic modulus G' (MPa) at −20° C. | Pressure sensitive adhesive strength (gf/inch) | Stress at 1000% strain (MPa) |
|---|---|---|---|---|---|---|
| Example 1 | 1.42 | 44.4/55.6 | — | 0.523 | 1250 | 0.179 |
| Example 2 | 1.42 | 42/58 | — | 0.419 | 1280 | 0.144 |
| Example 3 | 1.13 | 90/10 | — | 0.420 | 1140 | 0.171 |
| Comparative Example 1 | 0.705 | 95.5 | — | 0.095 | 240 | — |
| Comparative Example 2 | 1.40 | — | 55.3/44.7 | 0.171 | 1000 | 0.083 (0.104[a]) |
| Comparative Example 3 | 2.17 | 25/75 | — | 8.67 | 2210 | 0.0934 |
| Comparative Example 4 | 1.32 | 100/0 | — | 2.48 | 1410 | 0.164 |
| Comparative Example 5 | 1.75 | 100/0 | — | 19.3 | 2030 | 0.219 |
| Reference Example 1 | 1.76 | 100/0 | — | 27.5 | 2250 | 0.933 |
| Reference Example 2 | 1.76 | 100/0 | — | 24.0 | 2250 | 0.968 |

[a]Case in which curing was carried out at 180° C. for 3 minutes

As indicated in Table 2, the pressure sensitive adhesive layer-forming organopolysiloxane compositions according to Examples 1 to 3 have sufficient curability, a storage elastic modulus G' at −20° C. within a good range of 0.75 MPa or less, and sufficient adhesion for practical use.

In contrast, in Comparative Example 1, in which the mass ratio of component (B) to component (A) is outside the scope of rights, sufficient adhesive force cannot be achieved. Moreover, in Comparative Example 2, in which resin (b') having a high hydroxyl group content was used, curability at low temperatures was particularly insufficient, so an adequate cured product cannot be obtained without being heated to 180 degrees (which is difficult to apply to electronic components, etc. in practical use (based on a stress evaluation at 1000% strain). Moreover, in Comparative Example 3, in which the mass ratio of component (B) to component (A) is outside the scope of rights, the storage elastic modulus G' at −20° C. is high and cannot satisfy the required characteristics. Moreover, in both Comparative Examples 4 and 5, in which only resin component (b1) alone was used as component (B), the storage elastic modulus G' at −20° C. is high and cannot satisfy the required characteristics.

Note that Reference Examples 1 and 2 are illustrated for confirmation of the technical significance using resin having a low hydroxyl group content. Unlike Comparative Example 2, when only resin (b1) having a low hydroxyl group content is used, it is indicated that with the stress at 1000% strain, there was no difference between curing at 150° C. and curing at 180° C., enabling sufficient curing at 150° C. However, in the compositions of Reference Examples 1 and 2, the storage elastic modulus G' of the present invention cannot be achieved.

The invention claimed is:

1. A pressure sensitive adhesive layer-forming organopolysiloxane composition, the composition comprising:
   (A) a chain organopolysiloxane having alkenyl groups in numbers greater than 1 on average within the molecule;
   (B) an organopolysiloxane resin mixture comprising the following components (b1) and (b2) at a mass ratio of from 1:99 to 99:1:
      (b1) an organopolysiloxane resin, wherein the total content of hydroxyl groups and hydrolyzable groups with respect to all silicon atoms in the molecule is 9 mole % or less, and the weight average molecular weight (Mw) measured in terms of standard polystyrene by gel permeation chromatography (GPC) is 4500 or more; and
      (b2) an organopolysiloxane resin, wherein the total content of hydroxyl groups and hydrolyzable groups with respect to all silicon atoms in the molecule is 9 mole % or less, and the Mw measured in terms of standard polystyrene by GPC is less than 4500;
   (C) an organohydrogenpolysiloxane having at least two Si—H bonds in the molecule; and
   (D) an effective amount of a hydrosilylation reaction catalyst;
   wherein the mass ratio of component (B) to component (A) is within a range of 0.9 to 2.0, and the shear storage elastic modulus G' at −20° C. of a pressure sensitive adhesive layer obtained by curing the composition is within a range of 0.01 to 0.75 MPa; and
   wherein components (b1) and (b2) are free from silicon-bonded alkenyl groups.

2. The pressure sensitive adhesive layer-forming organopolysiloxane composition according to claim 1, wherein the adhesive force of a pressure sensitive adhesive layer having a thickness of 50 μm obtained by curing the composition, as measured at a tensile speed of 300 mm/min using a 180° peeling test method according to JIS Z 0237 for a polymethyl methacrylate sheet having a thickness of 2 mm, is within a range of 360 to 1700 gf/inch.

3. The pressure sensitive adhesive layer-forming organopolysiloxane composition according to claim 1, wherein:
   at least a portion of component (A) is (A1) a raw rubber-like alkenyl group-containing organopolysiloxane having a viscosity of 100,000 mPa·s or more at 25° C. or having a plasticity within a range of 50 to 200 as measured in accordance with a method as prescribed in JIS K6249, and the content of a vinyl ($CH_2=CH$) moiety of alkenyl groups is within a range of 0.005 to 0.400 mass %;
   component (B) is an organopolysiloxane resin mixture which consists essentially of $R_3SiO_{1/2}$ units and $SiO_{4/2}$ units, where R is a monovalent organic group and 90 mole % or more of R is an alkyl group having 1 to 6 carbon atoms or a phenyl group;
   component (C) is present in an amount such that the molar ratio of the amount of SiH groups in component (C) to the total amount of the alkenyl groups in components (A) and (B) is 0.1 to 100; and
   component (D) is present in an amount such that the content of a platinum based metal in a solid content of the composition is within a range of 0.1 to 200 ppm.

4. The pressure sensitive adhesive layer-forming organopolysiloxane composition according to claim 1, wherein component (C) is present in an amount such that the molar ratio of the amount of SiH groups in component (C) to the total amount of the alkenyl groups in components (A) and (B) is 20 to 60.

5. The pressure sensitive adhesive layer-forming organopolysiloxane composition according to claim 1, further comprising (A') a chain organopolysiloxane which does not contain a carbon-carbon double bond-containing reactive group in the molecule.

6. A pressure sensitive adhesive layer obtained by curing the pressure sensitive adhesive layer-forming organopolysiloxane composition according to claim 1.

7. A laminated body comprising a pressure sensitive adhesive layer obtained by curing the pressure sensitive adhesive layer-forming organopolysiloxane composition according to claim 1 on a film-like substrate.

8. The laminated body according to claim 7, wherein a release layer for the pressure sensitive adhesive layer is provided on one or two or more film-like substrates.

9. A laminated body comprising:
   a film-like substrate;
   a first release layer formed on the film-like substrate;
   a pressure sensitive adhesive layer formed by applying and curing the pressure sensitive adhesive layer-forming organopolysiloxane composition according to claim 1 on the first release layer; and
   a second release layer laminated on the pressure sensitive adhesive layer.

10. An elastic adhesive member obtained by curing the pressure sensitive adhesive layer-forming organopolysiloxane composition according to claim 1.

11. Electronic equipment or an electrical device comprising the elastic adhesive member according to claim 10.

12. A member for a speaker obtained by curing the pressure sensitive adhesive layer-forming organopolysiloxane composition according to claim 1.

13. A speaker comprising the member according to claim 12.

* * * * *